United States Patent
Minkovich et al.

(10) Patent No.: US 12,474,388 B1
(45) Date of Patent: Nov. 18, 2025

(54) SYNCHRONIZATION OF RF MEASUREMENTS IN NETWORKED SYSTEMS

(71) Applicant: Digital Dynamics, Inc., Scotts Valley, CA (US)

(72) Inventors: Alex Minkovich, Campbell, CA (US); Vikas Vinayak, Menlo Park, CA (US); Richard Casler, Cupertino, CA (US)

(73) Assignee: Digital Dynamics, Inc., Scotts Valley, CA (US)

( * ) Notice: Subject to any disclaimer, the term of this patent is extended or adjusted under 35 U.S.C. 154(b) by 172 days.

(21) Appl. No.: 18/532,568

(22) Filed: Dec. 7, 2023

Related U.S. Application Data

(60) Provisional application No. 63/430,925, filed on Dec. 7, 2022.

(51) Int. Cl.
*G01R 29/08* (2006.01)

(52) U.S. Cl.
CPC ..... *G01R 29/0871* (2013.01); *G01R 29/0814* (2013.01); *G01R 29/0878* (2013.01)

(58) Field of Classification Search
CPC ............ G01R 29/0871; G01R 29/0814; G01R 29/0878
See application file for complete search history.

(56) References Cited

U.S. PATENT DOCUMENTS 6,232,905 B1 * 5/2001 Smith ................ H03M 1/0836
341/118

* cited by examiner

*Primary Examiner* — Henry Luong
(74) *Attorney, Agent, or Firm* — Edward B. Weller

(57) ABSTRACT

A radio frequency measurement system comprises an analog-to-digital converter, a voltage-controlled oscillator, and a phase lock loop circuit. The analog-to-digital converter includes a first input to receive a radio frequency signal and includes a first output to provide a digital signal in response to the received radio frequency signal. The voltage-controlled oscillator includes a first input and includes a first output couped to the first input of the analog-to-digital converter to provide a sampling clock to the analog-to-digital converter. The phase lock loop circuit includes a first input to receive a distributed clock signal, includes a second input coupled to the first output of the voltage-controlled oscillator to receive the sampling clock, and includes an output coupled to the first input of the voltage-controlled oscillator to provide a phase locked signal to the voltage-controlled oscillator in response to the distributed clock signal and the sampling clock.

8 Claims, 10 Drawing Sheets

SYNCHRONIZATION OF RF MEASUREMENTS IN NETWORKED SYSTEMS

RELATED APPLICATION

This application claims the benefit under 35 USC § 119 to U.S. provisional patent application Ser. No. 63/430,925 filed on Dec. 7, 2022, which is incorporated by reference herein in its entirety.

BACKGROUND

The disclosure relates to measurement in networked systems, and in particular, to methods and systems for synchronization of RF measurements in networked systems.

Unless otherwise indicated herein, the approaches described in this section are not admitted to be prior art by inclusion in this section.

Some electronics systems require multiple radio frequency (RF) signals to be measured at the same time. Because RF signals are often, but not always, measured by sampling with an analog-to-digital converter (ADC), this requirement to measure multiple signals at the same time is called synchronized sampling. Synchronization of RF measurements can be achieved by using the same sampling clock. However, sharing the same sampling clock across multiple RF measurement units is not practical or realizable in many systems. In these systems, a reference clock, which is not the same frequency as the required sampling clock, is distributed amongst the many RF measurement units.

SUMMARY

The present disclosure provides for methods and systems for synchronization of RF measurements in networked systems. The methods and systems enable synchronized sampling in RF measurement units that are connected by a network with a controller-driven architecture. An example of such a system is EtherCat (Ethernet for Control Automation Technology).

In one embodiment, a radio frequency measurement system comprises an analog-to-digital converter, a voltage-controlled oscillator, and a phase lock loop circuit. The analog-to-digital converter includes a first input to receive a radio frequency signal and includes a first output to provide a digital signal in response to the received radio frequency signal. The voltage-controlled oscillator includes a first input and includes a first output couped to the first input of the analog-to-digital converter to provide a sampling clock to the analog-to-digital converter. The phase lock loop circuit includes a first input to receive a distributed clock signal, includes a second input coupled to the first output of the voltage-controlled oscillator to receive the sampling clock, and includes an output coupled to the first input of the voltage-controlled oscillator to provide a phase locked signal to the voltage-controlled oscillator in response to the distributed clock signal and the sampling clock.

In one embodiment, the phase lock loop circuit comprises a frequency divider coupled to a second output of the voltage-controlled oscillator to receive a second clock signal and includes an output to provide a divided frequency signal in response to the second clock signal. The phase lock loop circuit further comprises a phase frequency detector includes a first input to receive the distributed clock signal, includes a second input coupled to the output of the frequency divider to receive the divided frequency signal, and includes an output to provide a detected phase signal. The phase lock loop circuit also comprises a low pass filter includes an input coupled to the output of the phase frequency detector and includes an output coupled to the first input of the voltage-controlled oscillator to provide a low pass filtered signal in response to the detected phase signal.

In one embodiment, the distributed clock signal is received from a controller on a distributed network.

In one embodiment, the distributed network is an EtherCat network.

In one embodiment, a radio frequency measurement calibration system comprises first and second radio frequency measurement systems. Each radio frequency measurement system comprises an analog-to-digital converter, a voltage-controlled oscillator, and a phase lock loop circuit. The analog-to-digital converter includes a first input to receive a radio frequency signal and includes a first output to provide a digital signal in response to the received radio frequency signal. The voltage-controlled oscillator includes a first input and includes a first output couped to the first input of the analog-to-digital converter to provide a sampling clock to the analog-to-digital converter. The phase lock loop circuit includes a first input to receive a distributed clock signal, includes a second input coupled to the first output of the voltage-controlled oscillator to receive the sampling clock, and includes an output coupled to the first input of the voltage-controlled oscillator to provide a phase locked signal to the voltage-controlled oscillator in response to the distributed clock signal and the sampling clock.

In one embodiment, the radio frequency measurement calibration system further comprises a radio frequency generator to provide the radio frequency signal to the first and second analog-to-digital converters.

In one embodiment, the radio frequency measurement calibration system further comprises a radio frequency generator to provide the radio frequency signal; and a radio frequency splitter coupled between the radio frequency generator to receive the radio frequency signal and including first and second outputs couped to the first and second analog-to-digital converters, respectively, to provide the radio frequency signal to the first and second analog-to-digital converters as a split radio frequency signal in response to the radio frequency signal from the radio frequency generator.

In one embodiment, the phase lock loop circuit of the first and second radio frequency measurement system of the radio frequency measurement calibration system each comprises a frequency divider coupled to a second output of the voltage-controlled oscillator to receive a second clock signal and includes an output to provide a divided frequency signal in response to the second clock signal; a phase frequency detector includes a first input to receive the distributed clock signal, includes a second input coupled to the output of the frequency divider to receive the divided frequency signal, and includes an output to provide a detected phase signal; and a low pass filter includes an input coupled to the output of the phase frequency detector and includes an output coupled to the first input of the voltage-controlled oscillator to provide a low pass filtered signal in response to the detected phase signal.

In one embodiment, the disclosure provides a method for operating the systems described herein.

The features and advantages described in the specification are not all inclusive and, in particular, many additional features and advantages will be apparent to one of ordinary skill in the art in view of the drawings, specification, and claims. Moreover, it should be noted that the language used

DETAILED DESCRIPTION

Various embodiments of the present invention are now described with reference to the figures where like reference numbers indicate identical or functionally similar elements. Also in the figures, the left most digits of each reference number corresponds to the figure in which the reference number is first used.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

Figure 1:
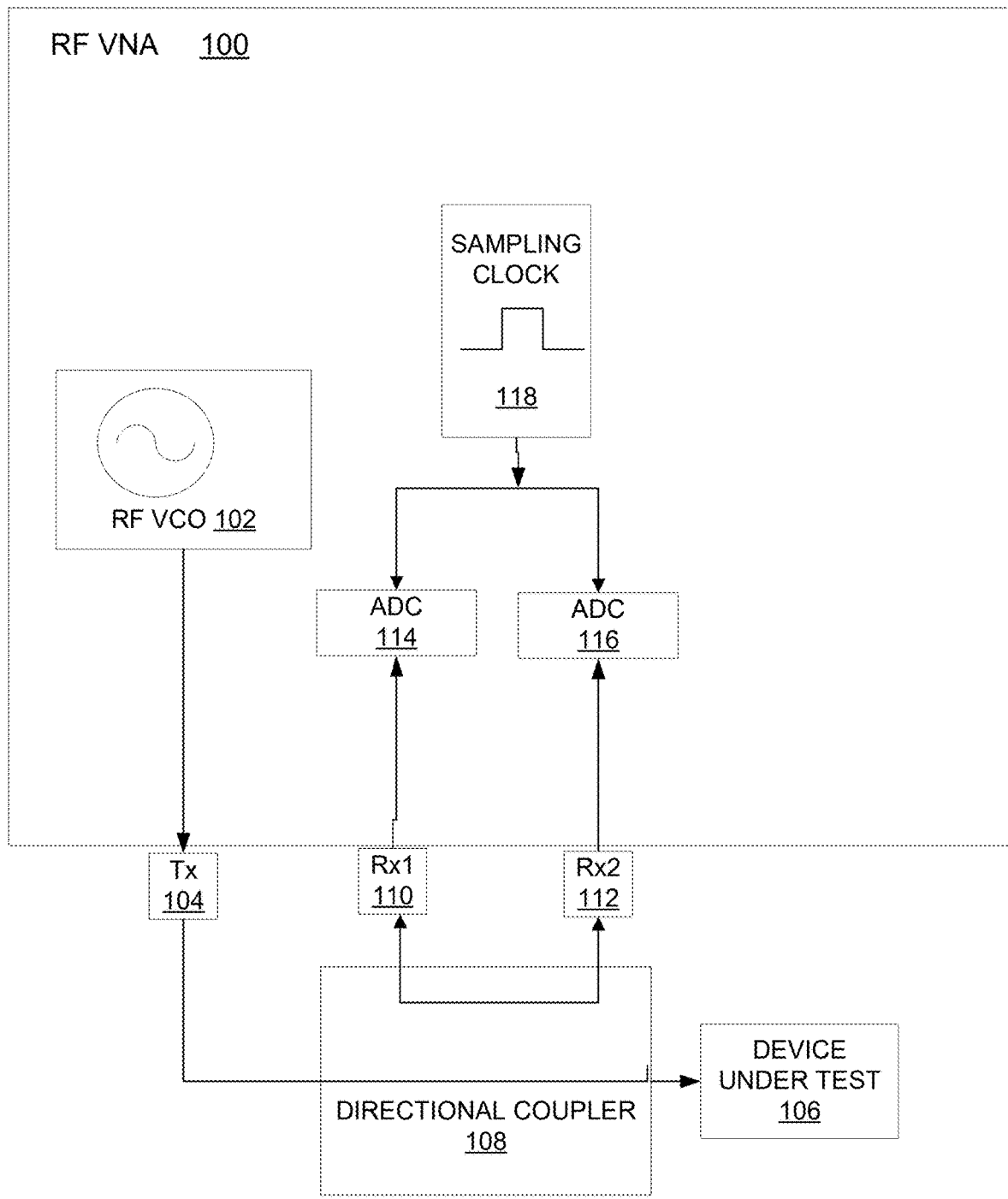
FIG. 1 is a block diagram illustrating a vector network analyzer.

FIG. 1 is a block diagram illustrating a RF vector network analyzer (VNA) 100.

The VNA 100 synchronously samples two or more RF signals to determine the phase difference between the RF signals. The VNA 100 comprises an RF voltage-controlled oscillator (VCO) 102 that provides RF signals via a transmit port 104 to a device under test 106 through a directional coupler 108.

The VNA 100 synchronously samples RF signals through receive ports 110 and 112 from the directional coupler 108 to analog-to-digital converters (ADCs) 114 and 116, respectively. The ADCs 114 and 116 are typically in the same housing to thereby allow the ADCs 114 and 116 to share a sampling clock 118.

Figure 2:
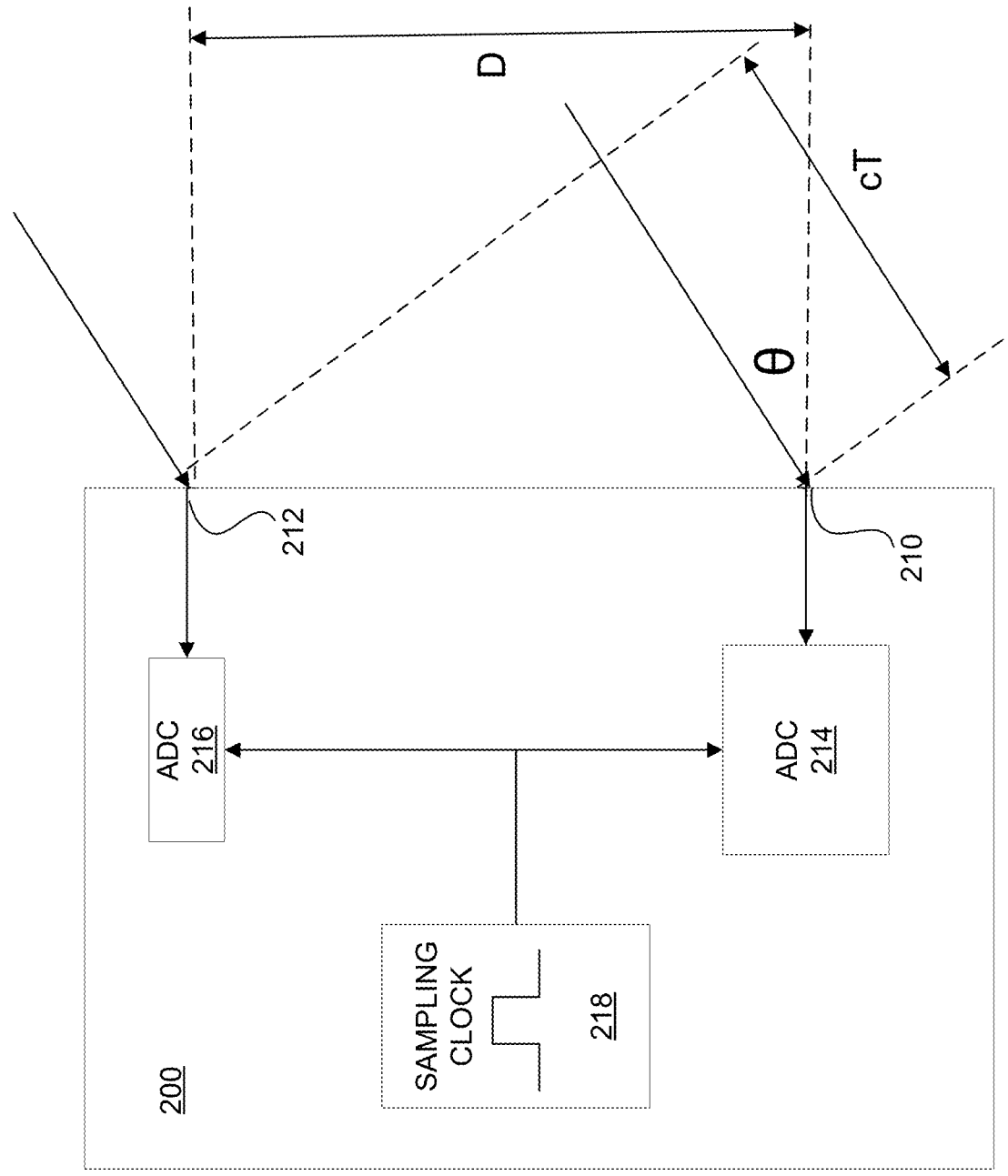
FIG. 2 is a block diagram of a radar detection system.

FIG. 2 is a block diagram of a radar detection system 200. A first receiver comprises a detector 210 and an ADC 214. A second receiver comprises a detector 212 and an ADC 216. The first and second receivers are separated by a distance D. The radar detection system 200 determines the direction of a target (not shown). The angle (shown as theta θ) of arrival indicates the direction of the target. The angle θ of the signal is computed from the time difference between the arrival of the return signals at the first and second receivers.

The angle θ of arrival may be determined from:

$$\sin(\theta) = cT/D$$

Where c is the speed of light, T is the time delay between arrival of signals, and D is the distance between the detectors 210 and 212. It follows from the equation that increasing the separation distance D between the two receivers reduces the timing resolution, and therefore related errors, in the first and second receivers. The first and second receivers share a sampling clock 218.

Figure 3:
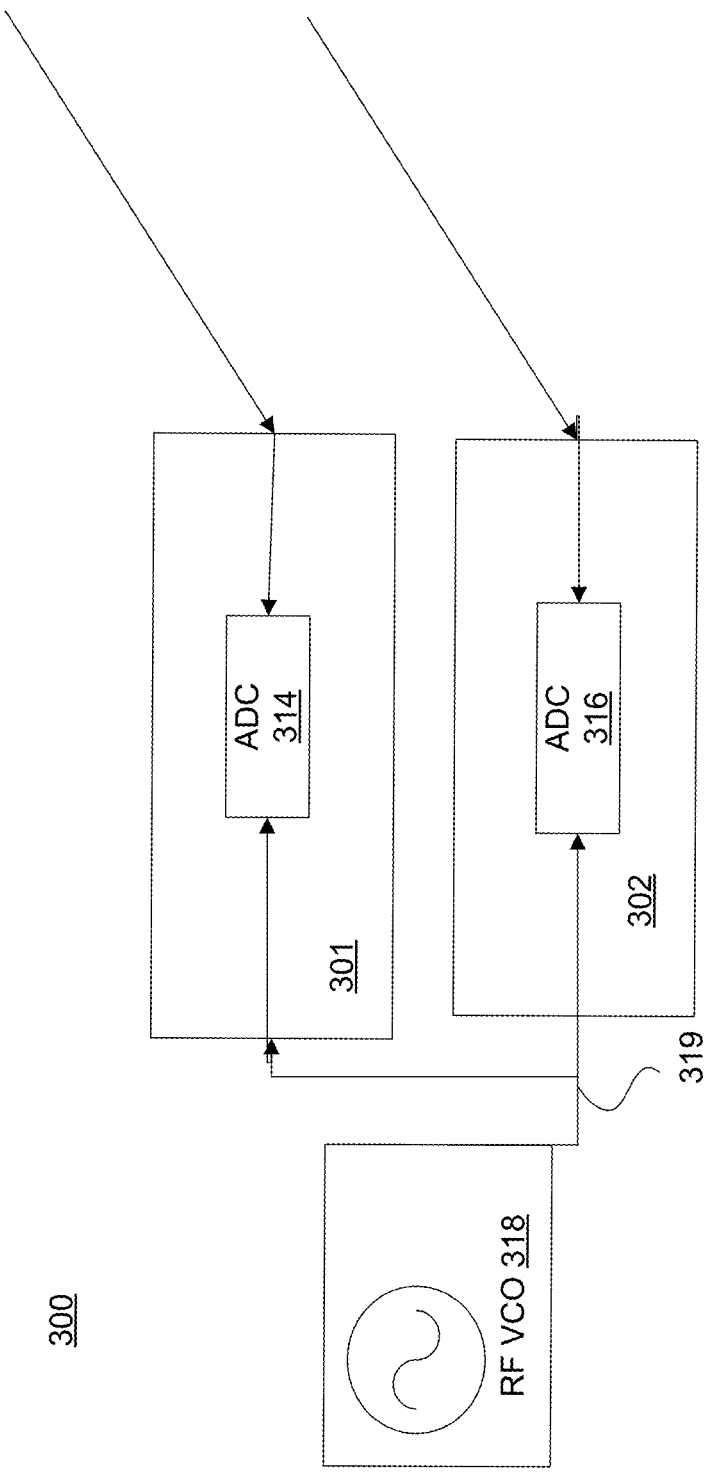
FIG. 3 is a block diagram illustrating a first radar detection system.

FIG. 3 is a block diagram illustrating a radar detection system 300. The radar detection system 300 comprises first and second receivers 301 and 302, respectively, a sampling clock 318, and an RF cable 319. Using the equation above for determining the receive angle, the system 200 of FIG. 2 has timing resolution limitations. The first and second receivers 301 and 302, respectively, may be separated so that the two receivers are no longer in the same housing. The RF cable 319 couples the sampling clock 318 to ADCs 314 and 316 that are included in the first and second receivers 301 and 302, respectively.

Figure 4:
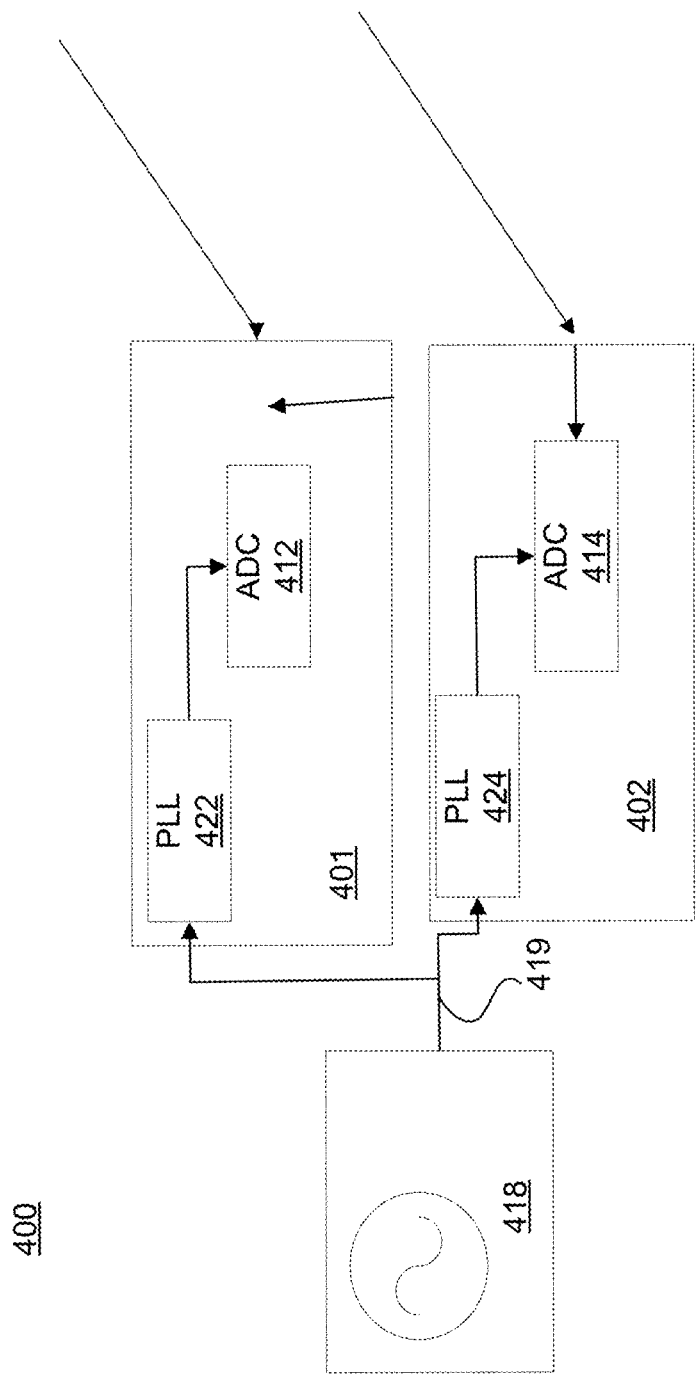
FIG. 4 is a block diagram illustrating a second radar detection system.

FIG. 4 is a block diagram illustrating a radar detection system 400. The radar detection system 400 comprises first and second receivers 401 and 402, respectively, a sampling clock 418 and an RF cable 419.

The first and second receivers 401 and 402, respectively, may be separated so that the two receivers are no longer in the same housing. The RF cable 419 couples the sampling clock 418 to phase lock loops (PLL) 422 and 424, respectively, that that are included in the first and second receivers 401 and 402, respectively. The PLLs 422 and 424 are coupled to ADCs 414 and 416, respectively, of the respective first and second receivers 401 and 402 for providing a phase locked sampling clock to each ADC.

The use of PLLs allows the system 400 to reduce issues of the sampling clocks that are often very high In frequency, and cables losses in sending the sampling clocks from one receiver to another receiver. Additionally, RF measurement units may have multiple frequency conversions, and the clocks or oscillators for those have to be synchronous as well. The system 400 reduces these problems by sending a common oscillator signal from the sampling clock 418, such as at 10 MHz, to the different RF measurement units of the receivers 401 and 402. Each receiver 401 and 402 uses the corresponding PLL to generate the various clocks and oscillator signals.

Figure 5:
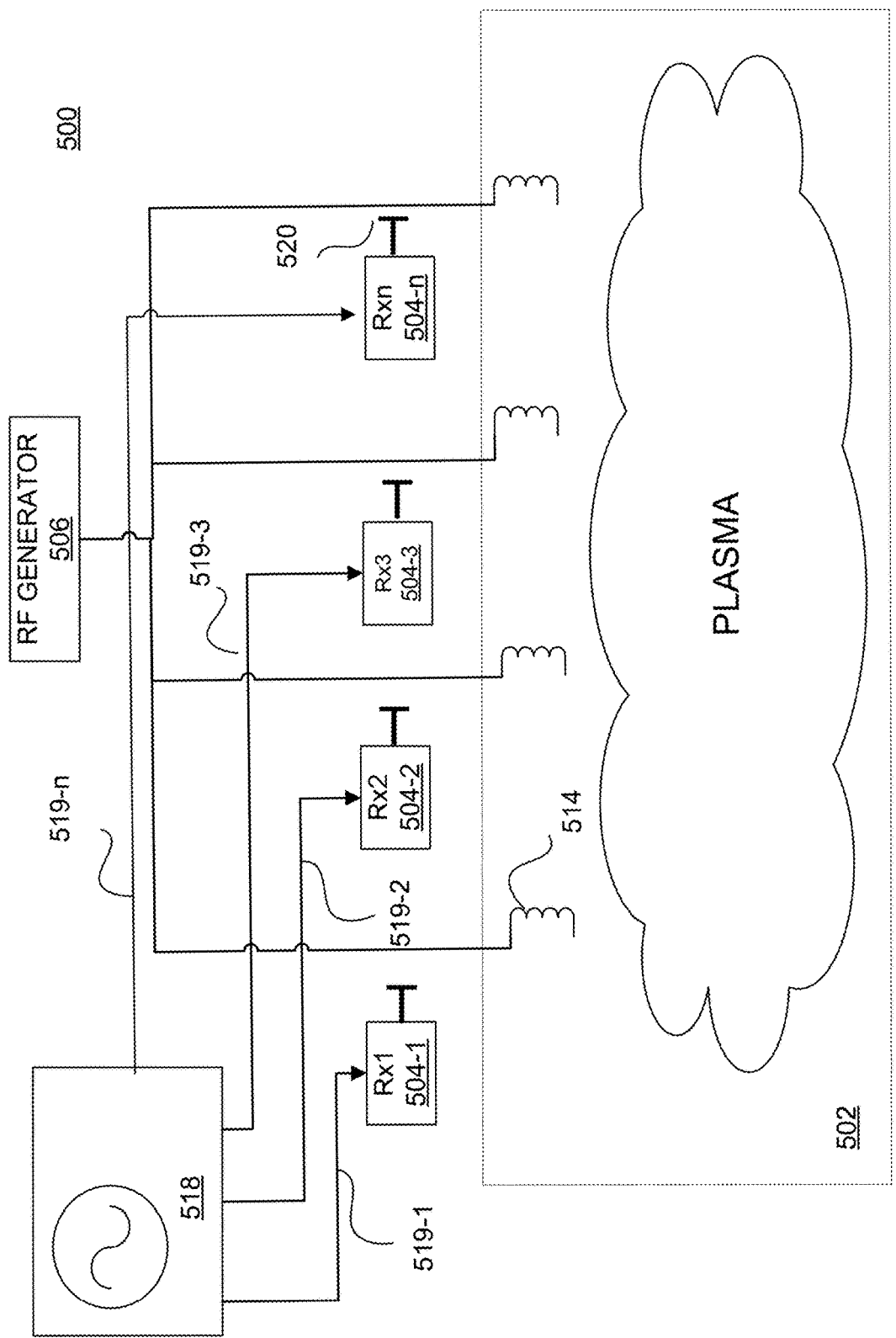
FIG. 5 is a block diagram of an RF measurement system for detecting RF signals in a plasma chamber.

FIG. 5 is a block diagram of an RF measurement system 500 for detecting RF signals in a plasma chamber 502. The RF measurement system 500 comprises an RF generator 506 to provide RF signals to the plasma chamber 502 thorough a plurality of directional coupler 512 (only one directional coupler is labeled with a reference number for simplicity) and a radiating element 514 (only one radiating element is labeled with a reference number for simplicity). A corresponding receiver of a plurality of receivers 504-1 through 504-n is coupled to a respective directional coupler 512 to detect RF signals in the directional coupler 512. A sampling clock 518 is coupled through RF cables 519-1 through 519-n to a respective RF receiver 504-1 through 504-n.

The cables 519 that transmit a common reference clock (say at 10 MHz) from the sampling clock 518 include extra connectors and cabling harnesses. Every extra cable and connector and harness reduces reliability, increases cost, makes maintenance harder, and increases space requirements. As an example, RF plasmas that are used in semiconductor manufacturing may measure synchronously at various different locations in the plasma chamber 502. In one such setup, up to twenty-five different measurement units are used, which in turn uses twenty-five different reference clock cables 519.

Figure 6:
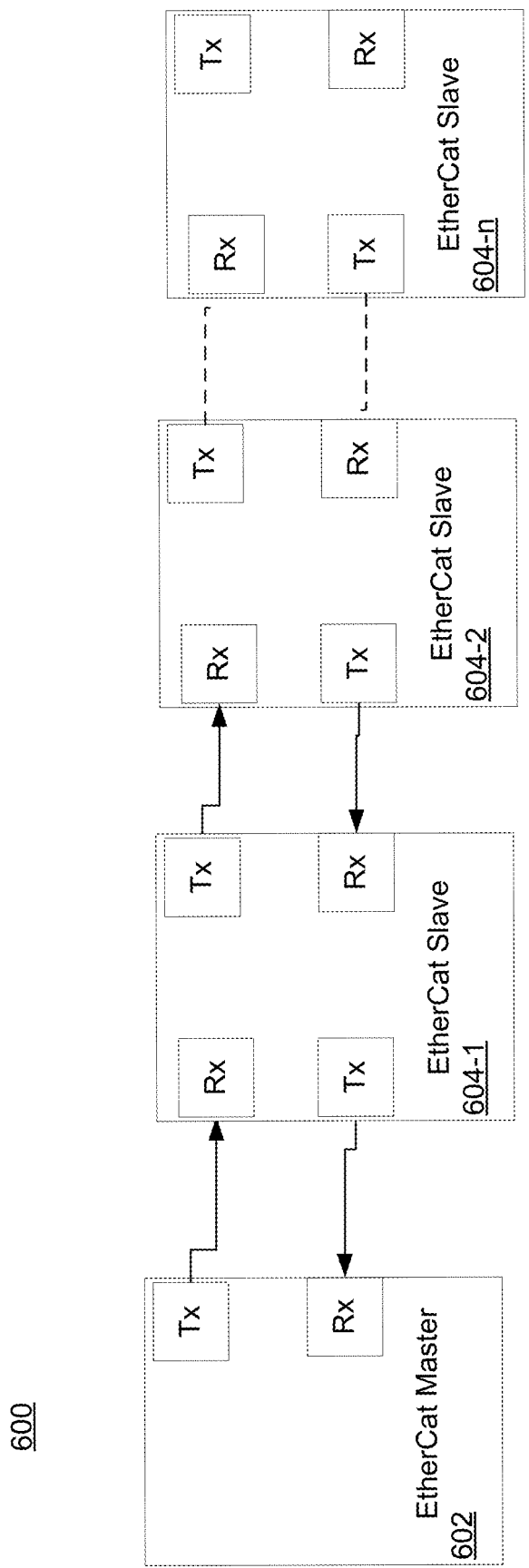
FIG. 6 is a block diagram illustrating a control system.

FIG. 6 is a block diagram illustrating a control system 600. The control system 600 is described in terms of an EtherCat system, but the present invention is not limited to an EtherCat system. The EtherCat system 600 comprises a controller 602 (referred to herein as "EtherCat master 602), a plurality of slave systems 604-1 through 604-n (referred to herein as "EtherCat slave 604'), and a plurality of controlled systems 606-1 through 606-n coupled to a respective slave system 604-1 through 604-n. Example controlled systems 606 include a servo motor system 606-1, a digital input/output (I/O) system 606-2, and an analog I/O system 606-n. The controlled systems 606 may be, for example, RF measurement units.

The controlled systems 606, such as RF measurement units coupled to a plasma chamber, may report the measurement data back to a controller, such as the EtherCat master 602. This data is transported over a network, such as EtherCat. The system 600 may have a real-time dependability of latency in order to implement real-time controls. For this, special industrial networks may be used, such as EtherCat.

The EtherCat master 602 sends out packets, which are passed in a daisy-chain fashion from one EtherCat slave 604 to another EtherCat slave 604, In this implementation, the EtherCat master 602 sends out packets to the EtherCat slave 604-1, which communicates as appropriate the packets to the next EtherCat slave 604-2, and in turn to the next slave 604 to finally the slave 604-n, Each slave 604 communicates in both directions with a corresponding controlled system 606.

EtherCat embeds a clock signal in its protocol. The frequency of this is programmable, but 1 kHz is a commonly used frequency. This clock is called "DC", or "Distributed Clock". The purpose of this clock is to time-stamp measurements being made by the various measurement devices on the EtherCat network.

Figure 7:
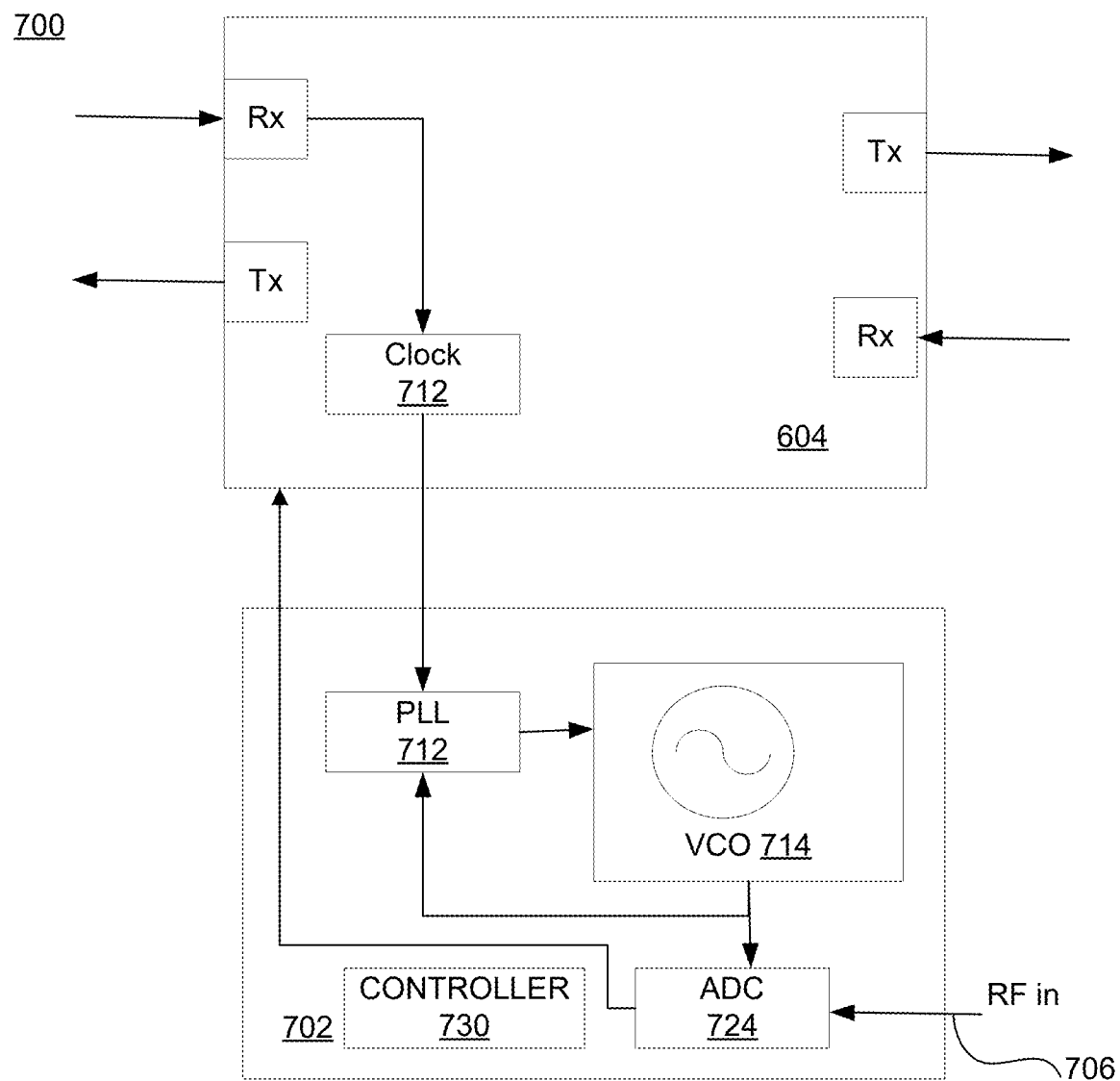
FIG. 7 is a block diagram of a first synchronized sampling system according to one embodiment.

FIG. 7 is a block diagram of a synchronized sampling system 700 according to one embodiment. The synchronized sampling system 700 comprises a controlled system 702, such as a controlled system 600 (FIG. 6). The system 700 further comprises a slave system 604, such as an EtherCat slave. The controlled system 702 comprises a phase lock loop circuit 712 (also referred to herein as "PLL 712"), a voltage-controlled oscillator 714, and an analog-to-digital converter 724. The controlled system 604 comprises a clock circuit 718 to provide a clock signal to the controlled system 702. The clock signal may be, for example, the distributed clock, such as in an EtherCat network. The system 702 also comprises a controller 730 for controlling the system 702 and processing data for communicating with the slave system 604. The controller 730 also processes time-stamps of data. The controller 730 may also be included in the systems of FIGS. 8-10.

The analog-to-digital converter 724 includes a first input that is coupled to an RF input signal terminal of the controlled system 702 to receive a radio frequency signal, such as a detected signal from a directional coupler and a plasma chamber, as described above. The analog-to-digital converter 724 also includes a first output coupled to the slave system 604 to provide a digital signal that is a sampled signal of the received radio frequency signal. The sampled signal may be used for the RF measurements described herein.

The voltage-controlled oscillator 714 includes a first input and further includes a first output couped to the first input of the analog-to-digital converter 724 to provide a sampling clock to the analog-to-digital converter 724.

The PLL 712 includes a first input to receive a distributed clock signal from the slave system 604. The PLL 712 further includes a second input coupled to the first output of the voltage-controlled oscillator 714 to receive the sampling clock. The PLL 712 also includes an output coupled to the first input of the voltage-controlled oscillator 714 to provide a phase locked signal to the voltage-controlled oscillator 714 in response to the distributed clock signal from the slave system 604 and the sampling clock from the voltage-controlled oscillator 714.

Figure 8:
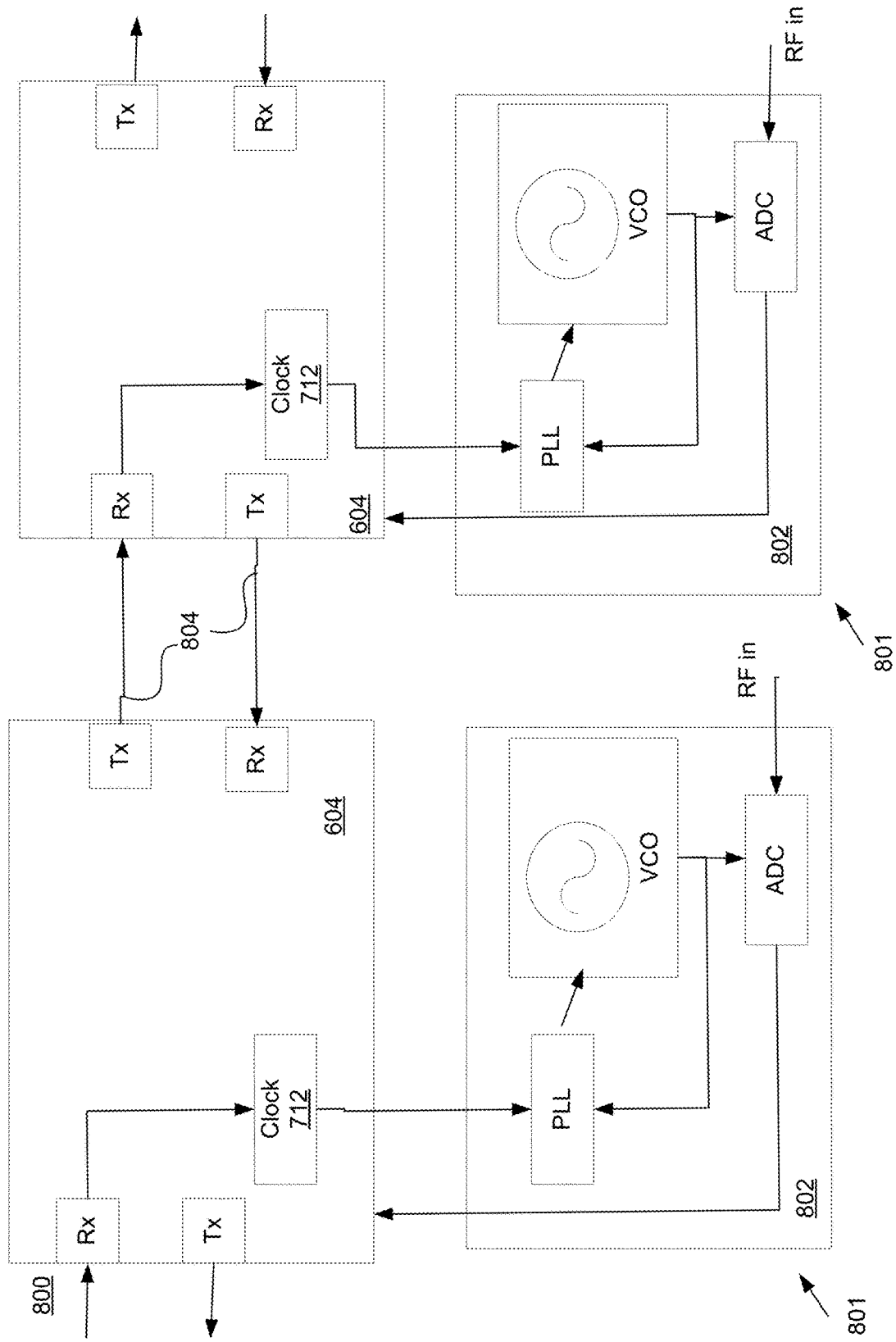
FIG. 8 is a block diagram illustrating a second synchronized sampling system according to one embodiment.

FIG. 8 is a block diagram illustrating a synchronized sampling system 800 according to one embodiment. The synchronized sampling system 800 comprises a plurality of synchronized sampling systems 801 that are coupled to each other by cables 804. The system 801 is similar to the system 700 (FIG. 7). Although two systems 801 are shown in FIG. 8, the system 800 may comprise two or more systems 801. The system 801 comprises are controlled system 604 and a controlled system 802 that may be, for example, the controlled system 702 (FIG. 7). Reference numbers of the internal elements are omitted for the controlled system 802 for simplicity and clarity. The controlled systems 604 are coupled to each other by one or more cables 804. The controlled systems 604 communicate the clock signal, such as the DC clock of EtherCat, to each other as a reference clock for the system 800. Using a common clock provides synchronization of the system 800. Because the DC clock signal is available on the networking cables 804, no additional cables are needed.

In some implementations, the DC clock by itself is not clean enough to used for sampling, For example, the specifications of the DC clock in EtherCat is +/−20 ns, In some implementations this may be sufficient, however, measuring a plasma signal at 13.56 MHz with 0.1 degree accuracy may have a stability of less than 17 ps.

The use of a PLL in which the VCO is a crystal or bulk acoustic wave (BAW) oscillator with very low phase noise stabilizes the jitter of +/−20 ns in the DC clock, bring the jitter down to the femto second level.

Using a common clock as the source for all the PLLs solves the frequency problem: Sampling in each of the slave systems 604s happens at the same frequency. However, for synchronized sampling to happen, in addition to the sampling frequency being the same, the sampling phase or instant also should be the same. The path length of the cable 804 between the two slave systems 604 adds an additional delay to the sampling instants of the subsequent slave system 604.

Figure 9:
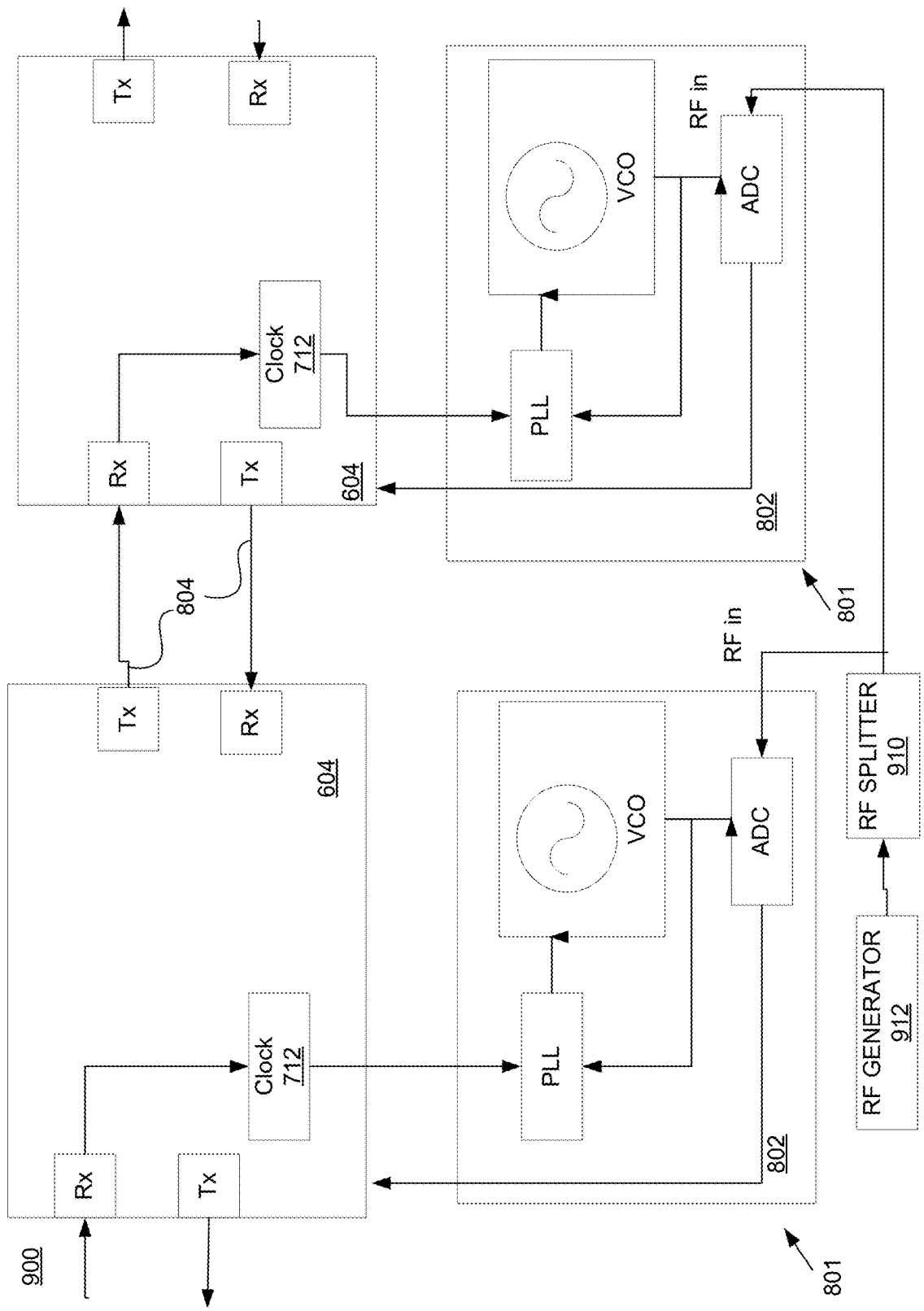
FIG. 9 is a block diagram illustrating a calibration system.

FIG. 9 is a block diagram illustrating a calibration system 900. The calibration system 900 comprises a a synchronized sampling system 800, an RF splitter 910, and an RF signal generator 912. Reference numbers of the internal elements are omitted for the controlled system 802 and the controlled slave 694 for simplicity a clarity.

The delay in the cable is fixed as long as the cable length is not changed, and can therefore be calibrated out. The RF splitter 910 splits the RF signal from the RF signal generator 912 into two equal signals. The splitter 910 may equally split the RF signal into more than two equal signals to calibrate several cables at one time or in sequence without a cable disconnect and reconnect. The splitter 910 provides the two identical RF signals to the sampling controlled systems 802 that capture the data samples. The captured samples for each of the controlled systems 802 will have a phase offset given by $$\text{Phase } \theta = \omega/\tau$$

Where ω=2*π*F where F is the frequency of the RF signal source that is sampled, and where τ is the delay time or time offset. This time offset information can be used to align the two sampled data streams from the two slave samplers (here two controlled systems 802). One way Is to modify the sampling timestamp of one of the slaves by this time offset, and the second way Is to modify the phase of the sampled signal by the phase offset. The method chosen can depend upon the end application. The processing may be done by a controller in the controlled system 802, the controlled system 604, the master 602 or a processor or controller coupled to the master 602 or a combination thereof.

Figure 10:
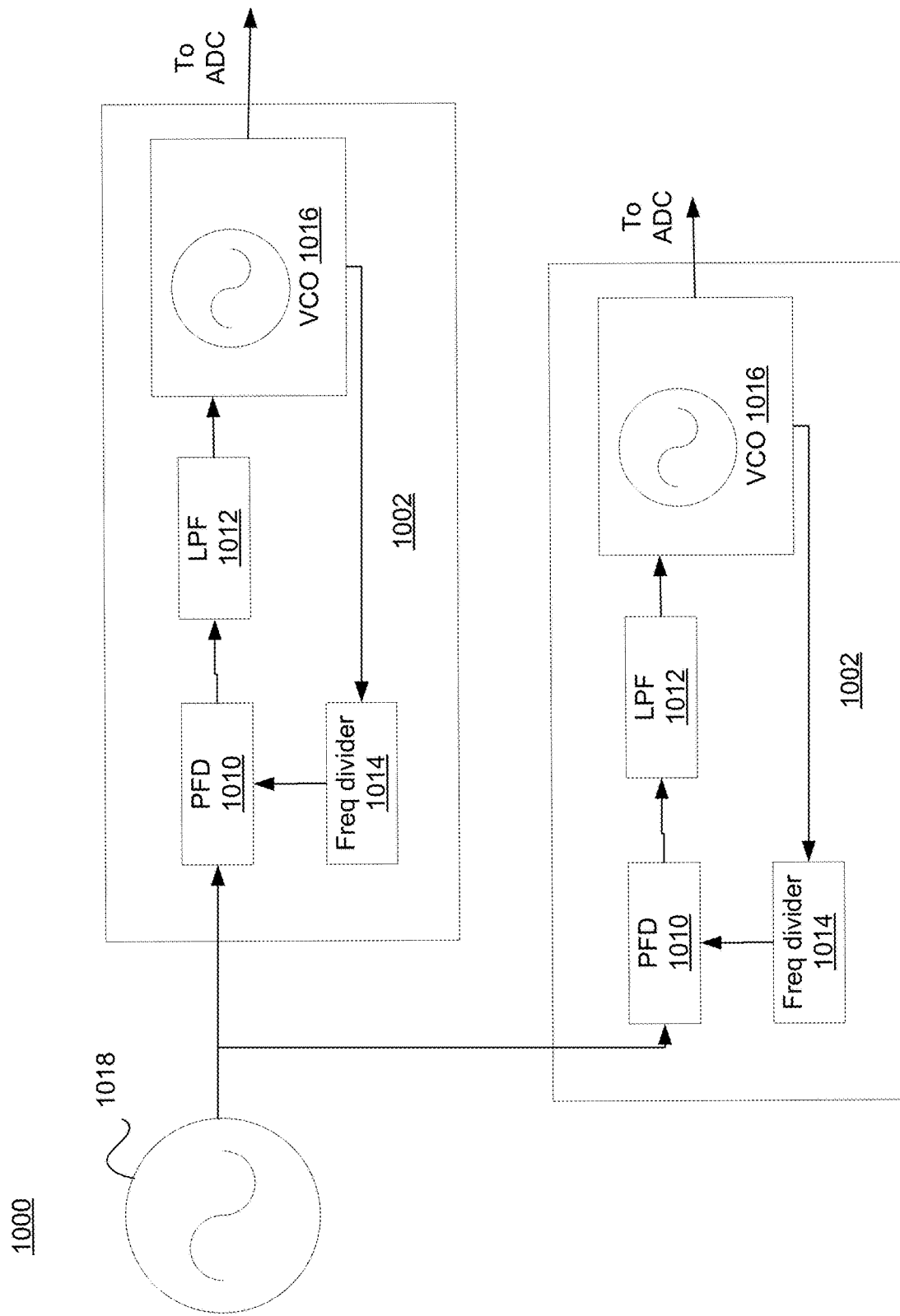
FIG. 10 is a block diagram of a third synchronized sampling system.

FIG. 10 is a block diagram of a synchronized sampling system 1000 according to one embodiment. The synchronized sampling system 1000 comprises a plurality of controlled systems 1002 (also referred to herein as "RF measurement system 1002") and a clock circuit 1018 that may be part of a slave system 604 (FIG. 6). The controlled system 1002 comprises a voltage-controlled oscillator 1016 and a phase lock loop circuit (also referred to herein as "PLL") that includes a phase frequency detector (PFD) 1010, a low pass filter (LPF) 1012, and a frequency divider 1014. The controlled system 1002 further comprises an analog-to-digital converter (not shown). The clock circuit 1018 provide a clock signal to the controlled systems 1002.

The frequency divider 1014 provides a divided frequency signal to the phase frequency detector 1010 in response to a clock signal output of the voltage-controlled oscillator 1016. The divided frequency signal may have a frequency equal to or about equal to the frequency of the distributed clock signal. The phase frequency detector 1010 is coupled to clock circuit 1018 to receive the distributed clock signal. Each phase frequency detector 1010 receives the distributed clock signal, although as noted the distributed clock signal may have jitter therein and delays from the cable. The phase frequency detector 1010 also includes an input coupled to the output of the frequency divider 1014 to receive the divided frequency signal, and includes an output to provide a detected phase signal to the low pass filter 1012. The low pass filter 1012 provides a low pass filtered signal to the voltage-controlled oscillator 1016 in response to the detected phase signal.

With the above calibration of FIG. 9, all sampling happens at the same time, there is still the ambiguity of time-stamps. That Is, which sample of a first slave system 602 corresponds to which sample of a second slave system 602. For this, a trigger clock can be used. In the embodiment of FIG. 10, the clock circuit 1018 provides a clock (e.g., a 1 kHz clock) that is distributed to various slave systems 604. In various embodiments, the 1 kHz clock of the clock circuit 1018 may have a lot of jitter, as the DC clock specification of EtherCat allows for a lot of jitter.

Internal to each slave system 602, as described above, the actual sampling clocks (e.g., 125 MHz) are generated by use of PLLs 712. Using the DC clock (e.g., 1 kHz) as the trigger signal that indicates to the slave systems 602 the initial time to as the first sample. However, if the clock signal as jitter, as is typical for a 1 kHz DC clock.

The PLL of the controlled system 1002 includes the frequency divider 1014 to divided the signal (e.g., 125 MHz) of the VCO 1016 by a number (e.g., 125,000) to generate a divided signal (e.g., 1 kHz) to the phase frequency detector 1010 compares to the DC clock (e.g., 1 kHz). This divided signal has low jitter as it is derived from the 125 MHz VCXO, yet it is on average the exact same frequency and phase as the 1 KHz DC clock. Many PLL chips have an ability to route out this signal to a test pin that can be used as a low-jitter time-stamping mechanism.

Various embodiments provide for elimination of the cables for distributing the reference clock that achieves increased reliability, decreased cost, improved maintainability, and reduced space requirements.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Also, as used in the description herein and throughout the claims that follow, the meaning of "on" includes "in" and "on" unless the context clearly dictates otherwise.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A radio frequency measurement system comprising:
   an analog-to-digital converter includes a first input to receive a radio frequency signal and includes a first output to provide a digital signal in response to the received radio frequency signal;
   a voltage-controlled oscillator includes a first input and includes a first output couped to the first input of the analog-to-digital converter to provide a sampling clock to the analog-to-digital converter; and
   a phase lock loop circuit includes a first input to receive a distributed clock signal, includes a second input coupled to the first output of the voltage-controlled oscillator to receive the sampling clock, and includes an output coupled to the first input of the voltage-controlled oscillator to provide a phase locked signal to the voltage-controlled oscillator in response to the distributed clock signal and the sampling clock.

2. The radio frequency measurement system of claim 1, wherein the phase lock loop circuit comprises:
   a frequency divider coupled to a second output of the voltage-controlled oscillator to receive a second clock signal and includes an output to provide a divided frequency signal in response to the second clock signal;
   a phase frequency detector includes a first input to receive the distributed clock signal, includes a second input coupled to the output of the frequency divider to receive the divided frequency signal, and includes an output to provide a detected phase signal; and a low pass filter includes an input coupled to the output of the phase frequency detector and includes an output coupled to the first input of the voltage-controlled oscillator to provide a low pass filtered signal in response to the detected phase signal.

3. The radio frequency measurement system of claim 1, wherein the distributed clock signal is received from a controller on a distributed network.

4. The radio frequency measurement system of claim 3, wherein the distributed network is an EtherCat network.

5. A radio frequency measurement calibration system comprising:
 a first radio frequency measurement system comprising:
  a first analog-to-digital converter includes a first input to receive a radio frequency signal and includes a first output to provide a digital signal in response to the received radio frequency signal;
  a first voltage-controlled oscillator includes a first input and includes a first output couped to the first input of the first analog-to-digital converter to provide a sampling clock to the first analog-to-digital converter; and
  a first phase lock loop circuit includes a first input to receive a distributed clock signal, includes a second input coupled to the first output of the first voltage-controlled oscillator to receive the sampling clock, and includes an output coupled to the first input of the first voltage-controlled oscillator to provide a phase locked signal to the first voltage-controlled oscillator in response to the distributed clock signal and the sampling clock; and
 a second radio frequency measurement system comprising:
  a second analog-to-digital converter includes a first input to receive a radio frequency signal and includes a first output to provide a digital signal in response to the received radio frequency signal;
  a second voltage-controlled oscillator includes a first input and includes a first output couped to the first input of the second analog-to-digital converter to provide a sampling clock to the second analog-to-digital converter; and
  a second phase lock loop circuit includes a first input to receive a distributed clock signal, includes a second input coupled to the first output of the second voltage-controlled oscillator to receive the sampling clock, and includes an output coupled to the first input of the second voltage-controlled oscillator to provide a phase locked signal to the second voltage-controlled oscillator in response to the distributed clock signal and the sampling clock.

6. The radio frequency measurement calibration system of claim 5, further comprising a radio frequency generator to provide the radio frequency signal to the first and second analog-to-digital converters.

7. The radio frequency measurement calibration system of claim 5, further comprising:
 a radio frequency generator to provide the radio frequency signal; and
 a radio frequency splitter coupled between the radio frequency generator to receive the radio frequency signal and including first and second outputs couped to the first and second analog-to-digital converters, respectively, to provide the radio frequency signal to the first and second analog-to-digital converters as a split radio frequency signal in response to the radio frequency signal from the radio frequency generator.

8. The radio frequency measurement calibration system of claim 5, wherein the phase lock loop circuit of the first and second radio frequency measurement system each comprises:
 a frequency divider coupled to a second output of the voltage-controlled oscillator to receive a second clock signal and includes an output to provide a divided frequency signal in response to the second clock signal;
 a phase frequency detector includes a first input to receive the distributed clock signal, includes a second input coupled to the output of the frequency divider to receive the divided frequency signal, and includes an output to provide a detected phase signal; and
 a low pass filter includes an input coupled to the output of the phase frequency detector and includes an output coupled to the first input of the voltage-controlled oscillator to provide a low pass filtered signal in response to the detected phase signal.

* * * * *